United States Patent
Schall (10) Patent No.: US 9,573,846 B2
(45) Date of Patent: Feb. 21, 2017

(54) TRANSPARENT WINDOW WITH A HEATABLE COATING AND LOW-IMPEDANCE CONDUCTING STRUCTURES

(75) Inventor: Guenther Schall, Kreuzau (DE)

(73) Assignee: SAINT-GOBAIN GLASS FRANCE, Aubervilliers (FR)

( * ) Notice: Subject to any disclaimer, the term of this patent is extended or adjusted under 35 U.S.C. 154(b) by 344 days.

(21) Appl. No.: 12/936,200

(22) PCT Filed: Mar. 21, 2009

(86) PCT No.: PCT/EP2009/002094
§ 371 (c)(1),
(2), (4) Date: Dec. 6, 2010

(87) PCT Pub. No.: WO2009/124646
PCT Pub. Date: Oct. 15, 2009

(65) Prior Publication Data
US 2011/0108537 A1    May 12, 2011

(30) Foreign Application Priority Data
Apr. 10, 2008  (DE) .................. 10 2008 018 147

(51) Int. Cl.
*B60L 1/02* (2006.01)
*H05B 11/00* (2006.01)
(Continued)

(52) U.S. Cl.
CPC .... *C03C 17/3655* (2013.01); *B32B 17/10036* (2013.01); *B32B 17/1077* (2013.01);
(Continued)

(58) Field of Classification Search
CPC ........ B32B 17/10036; B32B 17/10229; B32B 17/10247; B32B 17/10761; B32B 17/1077;
(Continued)

(56) References Cited

U.S. PATENT DOCUMENTS 2,557,983 A * 6/1951 Linder ................ C03C 17/3411
106/1.14
2,924,540 A   2/1960 D'Andrea
(Continued)

FOREIGN PATENT DOCUMENTS

DE    1256812    12/1967
DE    2936398    3/1981
(Continued)

OTHER PUBLICATIONS

PCT International Search Report for PCT/EP2009/002094 filed on Mar. 21, 2009 in the name of Saint-Gobain Glass France.
(Continued)

*Primary Examiner* — David Angwin
*Assistant Examiner* — Gyounghyun Bae
(74) *Attorney, Agent, or Firm* — Steinfl & Bruno, LLP (57) ABSTRACT

The present invention relates to a transparent pane with an electrically heatable coating, which extends over a major part of the surface area of the pane and is electrically connected to at least two low-impedance bus bars lying opposite one another, at least one conducting structure (4G, 5G) only covering the heating area outside a central viewing area, in order to shorten electrically the distance between the bus bars (4, 5), and in that the current flows in the part of the heating area that is not covered by at least one conducting structure (4G, 5G).

21 Claims, 9 Drawing Sheets (51) Int. Cl.
| | |
|---|---|
| *H05B 3/00* | (2006.01) |
| *G02B 5/20* | (2006.01) |
| *B05B 5/00* | (2006.01) |
| *C03C 17/36* | (2006.01) |
| *B32B 17/10* | (2006.01) |
| *H05B 3/86* | (2006.01) |

(52) U.S. Cl.
CPC .. *B32B 17/10229* (2013.01); *B32B 17/10247* (2013.01); *B32B 17/10761* (2013.01); *C03C 17/36* (2013.01); *C03C 17/3673* (2013.01); *H05B 3/86* (2013.01); *H05B 2203/008* (2013.01); *H05B 2203/013* (2013.01); *H05B 2203/016* (2013.01)

(58) Field of Classification Search
CPC . C03C 17/36; C03C 17/3655; C03C 17/3673; H05B 3/86; H05B 2203/008; H05B 2203/013; H05B 2203/016; H05B 2203/003; H05B 2203/014; H05B 3/36; H05B 3/06; F24D 13/024
USPC .......... 219/201–203, 494; 359/359; 427/160; 428/34, 213, 215, 425.6, 426, 428, 441
See application file for complete search history.

(56) References Cited

U.S. PATENT DOCUMENTS

| | | | | |
|---|---|---|---|---|
| 3,015,016 | A * | 12/1961 | Cole | .......................... 392/435 |
| 3,052,573 | A | 9/1962 | Dumesnil | |
| 3,235,712 | A * | 2/1966 | Watson | .......................... 219/549 |
| 3,484,583 | A * | 12/1969 | Shaw, Jr. | ...................... 219/522 |
| 3,553,833 | A | 1/1971 | Jochim et al. | |
| 3,659,079 | A * | 4/1972 | Whittemore | ............. H05B 3/84 219/203 |
| 4,020,206 | A * | 4/1977 | Beil | ........................ H01B 1/16 252/514 |
| 4,196,338 | A | 4/1980 | Edel | |
| 4,385,226 | A | 5/1983 | Sauer | |
| 4,443,691 | A * | 4/1984 | Sauer | ...................... B32B 17/10 219/203 |
| 4,543,466 | A * | 9/1985 | Ramus | ............. B32B 17/10036 219/203 |
| 4,778,732 | A | 10/1988 | Hasegawa et al. | |
| 4,786,784 | A * | 11/1988 | Nikodem | .......... B32B 17/10036 204/192.26 |
| 4,808,799 | A * | 2/1989 | Schave | ............. B32B 17/10036 219/203 |
| 4,847,472 | A * | 7/1989 | Koontz | ............. B32B 17/10036 219/203 |
| 4,894,514 | A * | 1/1990 | Delvin | ............. B32B 17/10036 219/203 |
| 4,939,348 | A * | 7/1990 | Criss | ................. B32B 17/10036 219/203 |
| 4,971,848 | A * | 11/1990 | Ruelle | ...................... H05B 3/84 219/203 |
| 5,099,104 | A * | 3/1992 | Holzer | .............. B32B 17/10036 219/203 |
| 5,099,105 | A * | 3/1992 | Goerenz | ........... B32B 17/10036 219/203 |
| 5,128,513 | A * | 7/1992 | Byars | ................. B32B 17/10036 219/203 |
| 5,162,145 | A * | 11/1992 | Schaefer | ........... B32B 17/10036 428/209 |
| 5,414,240 | A * | 5/1995 | Carter | ................ B32B 17/10036 219/203 |
| 5,616,173 | A | 4/1997 | Okamoto et al. | |
| 6,043,782 | A * | 3/2000 | Dishart | ............. B32B 17/10036 343/713 |
| 6,100,209 | A * | 8/2000 | Bentem | ...................... C03C 8/14 427/163.1 |
| 6,303,905 | B1 * | 10/2001 | Chiles et al. | ................. 219/213 |
| 6,320,276 | B1 | 11/2001 | Sauer | |
| 6,670,581 | B1 | 12/2003 | Degand et al. | |
| 6,791,065 | B2 * | 9/2004 | Bartrug | ..................... B32B 3/10 219/203 |
| 6,791,066 | B2 * | 9/2004 | Hawk | ...................... H05B 3/84 219/203 |
| 6,863,923 | B1 * | 3/2005 | Kalleder | .................. B41M 1/12 106/287.1 |
| 6,870,134 | B2 * | 3/2005 | Sol et al. | ...................... 219/203 |
| 6,891,517 | B2 * | 5/2005 | Voeltzel | ............ B32B 17/10036 343/704 |
| 6,995,339 | B2 * | 2/2006 | Schwartz | ................ B60S 1/048 219/202 |
| 7,019,260 | B1 * | 3/2006 | Degand et al. | ............... 219/203 |
| 7,132,625 | B2 * | 11/2006 | Voeltzel | ............ B32B 17/10036 219/203 |
| 7,223,940 | B2 * | 5/2007 | Voeltzel et al. | ............... 219/203 |
| 7,880,120 | B2 * | 2/2011 | Schmidt | ........... B32B 17/10036 219/203 |
| 8,431,871 | B2 * | 4/2013 | Schmidt | ........... B32B 17/10036 219/203 |
| 8,653,419 | B2 * | 2/2014 | Weiss | ...................... H05B 3/84 219/202 |
| 2003/0146199 | A1 | 8/2003 | Sol et al. | |
| 2004/0086652 | A1 | 5/2004 | Degand | |
| 2006/0186104 | A1 * | 8/2006 | Winter | .......................... 219/203 |
| 2007/0151966 | A1 * | 7/2007 | Schwenke et al. | .......... 219/203 |
| 2009/0044464 | A1 | 2/2009 | Schmidt et al. | |

FOREIGN PATENT DOCUMENTS

| | | | |
|---|---|---|---|
| DE | 3644297 | | 7/1987 |
| DE | 19702448 | | 7/1998 |
| DE | 19829151 | | 2/2000 |
| DE | 19832228 | | 2/2000 |
| DE | 102004050158 | | 4/2006 |
| EP | 0 410 952 | | 1/1991 |
| EP | 1168888 | A2 | 1/2002 |
| EP | 1605729 | A2 * | 12/2005 |
| EP | 2201817 | B1 | 10/2011 |
| GB | 2 186 769 | | 8/1987 |
| WO | 00/72 635 | | 11/2000 |
| WO | 00/72635 | | 11/2000 |
| WO | 03/024155 | | 3/2003 |
| WO | 03/075351 | | 9/2003 |
| WO | 2004/032569 | | 4/2004 |
| WO | 2006030165 | A1 | 3/2006 |
| WO | WO 2007003849 | A2 * | 1/2007 |
| WO | WO 2007076502 | A1 * | 7/2007 ............... H05B 3/84 |
| WO | WO 2007083038 | A2 * | 7/2007 |

OTHER PUBLICATIONS

Written Opinion of the International Searching Authority for PCT/EP2009/002094 filed on Mar. 21, 2009 in the name of Saint-Gobain Glass France.

"General Guidelines for the use of FERRO Silver pastes" retrieved from the web (http://www.ferro.com/Our+Products/ColorsGlass/Automotive/) on Oct. 26, 2015, 11 pages (PDF file appears dated Oct. 2007).

* cited by examiner

TRANSPARENT WINDOW WITH A HEATABLE COATING AND LOW-IMPEDANCE CONDUCTING STRUCTURES

CROSS REFERENCE TO RELATED APPLICATIONS

The present application is the US national stage of International Application PCT/EP2009/002094 filed on Mar. 21, 2009 which, in turn, claims priority to German Application 10 2008 018 147.1 filed on Apr. 10, 2008.

FIELD

The invention relates to a transparent pane with an electrically heatable coating having the features of the precharacterizing clause of Patent Claim 1.

For vehicle windscreens in particular, there is a great demand for heatable designs, it being required that the heating as such is as invisible or unobtrusive as possible. Therefore, a heatable transparent coating of the panes is increasingly in demand.

BACKGROUND

A general problem of heatable coatings with low light absorption is their still relatively high sheet resistance, which at least in the case of large dimensions of the window to be heated or long current paths requires a high operating voltage, which is at least higher than the conventional voltages of the electrical systems in vehicles. If it were desired to lower the sheet resistance, with the previously known systems of layers this would entail a reduction in the transmission of visible light, since the conductive layers would have to be thicker.

For these technical reasons, wire-heated panes, which can be readily fed with the conventional vehicle voltage, are currently still fitted with preference. However, these laminated windows with inlaid heating areas comprising very thin wires are not accepted by all customers.

The patent DE 1 256 812 B1 describes a glass sheet which can be heated by means of an electrically conductive layer of metal or metal oxide applied over its surface area. This publication with application priority from 1963 is based on a very high sheet resistance of 200 Ω/unit of surface area. In order nevertheless to heat this layer homogeneously with a relatively low voltage by means of two lateral low-impedance bus bars, narrow, printed, low-impedance comb electrodes are provided, extending from said bus bars over the entire viewing area of the pane. These electrodes mesh with one another with alternating polarity. They only end in each case shortly before the bus bar respectively lying opposite. This does indeed achieve the effect that, transversely to the longitudinal extent of the individual lines of the comb electrodes, the heating current only has to cover relatively short paths within the layer.

Mentioned there as an advantage in comparison with windows which are only heated with the aid of printed narrow heating conductors is the homogeneous heating output with relatively great mutual distances between the comb electrodes.

However, the said lines, resembling shading, disturb the view through the window and the visual appearance of the main viewing area of the pane configured in this way. The optical advantage of a transparent heating layer remains unused. This window is only intended as a rear window for automobiles. Even now, it should not be used as a windscreen, since they must not have anything impeding the view, at least in a standardized A viewing area, as it is known.

A further problem with coatings for heating purposes may be caused by factors such as that they cannot be applied homogeneously over the entire surface area of the transparent pane but instead have to be provided with one or more interruptions in them, known as communication windows, which impair the flow of the heating current and possibly lead to the formation of hot spots (instances of local overheating) at their edges. Such communication windows serve the purpose of making the coating locally more transmissive for certain information flows or signals, whereas it intrinsically reflects shortwave or infrared rays.

For leading the heating current in and out of such coatings, at least one pair of electrodes (in strip form) or collecting conductors (also known as bus bars) is provided, intended to lead the currents into the surface of the layers as uniformly as possible and distribute them widely. In the case of vehicle windows, which are appreciably wider than they are high, the bus bars usually lie along the longer edges (at the top and bottom in the fitted position) of the window, so that the heating current can flow along the shorter path over the height of the window. At the same time, the communication windows mentioned usually lie at the upper edge of the window, where they extend over a width of several centimeters.

The document WO 00/72 635 A1 describes a transparent substrate with an IR-reflective coating and a communication window produced by removing or omitting the coating over a surface area.

Obviously, any communication window that changes the homogeneity of the coating constitutes a disturbance of the current flows. Local temperature peaks (hot spots) occur and may lead to damaging of the substrate (thermal stresses) and of the coating itself. This is not only the case when the coating is omitted over a large area but also when the communication window is formed by a greater or lesser number of individual, discrete slits. These also constitute a notable increase in the sheet resistance in the area concerned and at the same time likewise cause the hot spots mentioned.

As a measure for reducing the disturbing effect of the large-area communication window, the last-mentioned document proposes providing at the edge of said window an electrically conductive band that has a very much lower ohmic resistance per unit area than the heating layer. It is intended to make the currents bypass the cutout. With preference, a communication window is completely surrounded by such a band. The band can be produced by printing on and baking a conductive screen printing paste containing silver. It may, however, also be provided by applying an electrically conductive lacquer or by placing on a metallic strip. In all cases, an electrically conducting connection of the band to the coating is of course functionally necessary.

The band may be optically masked by overlaying an opaque, electrically nonconductive masking strip, for example of black enamel. Such masking strips generally consist of a nonconductive, black-coloured material that can be baked (screen printing paste). Infrared radiation is not reflected by this material but absorbed.

WO 03/024 155 A2 discloses a relevant transparent window with a heatable coating in which an operating voltage of at most 42 V is specified but which also attempts to solve the problem of hot spots at the edges of a communication window. In general, a number of different voltage levels are used, a lower voltage being applied to current paths that have been shortened (for example because of the communication window), in order to avoid local overheating. Specifically, the region of the communication window is left in the heatable surface area by placing a separate bus bar between the communication window and the bus bar on the other side.

Furthermore, DE 36 44 297 A1 discloses many examples of subdividing heatable coatings of a vehicle windscreen. Subdivisions can accordingly be provided by leaving portions without layers over a surface area and/or by incisions being made mechanically or by laser radiation. They serve for the selective setting and directing of a current flow within the coated surface area and are intended to ensure a current density that is as uniform as possible in the surface areas concerned.

WO 2004/032569 A2 discloses a further design of a transparent pane with a heatable coating, which likewise seeks to achieve a homogeneous heating output in the surface area by separating lines introduced into the coating.

DE 29 36 398 A1 is concerned with measures for preventing current peaks at the transition from the bus bars to the coating in a transparent window with a heatable coating. It is generally endeavoured to reduce the abrupt difference in resistance between the coating and the bus bars by using materials or formations of higher impedance for the latter, or else by means of intermediate resistances. For the coating, sheet resistances of between 1 and 10 ohms per unit area are specified there. In one or more solution variants described there, the edge of each bus bar facing the respectively opposite bus bar is of a wavy form. This is intended to avoid the formation of peaks directed towards the coating for heating purposes. With this approach, a notable lengthening of the transitional line between the bus bar and the coating is sought, and consequently a reduction in the current density at this transition. However, all these measures appear to be little suited for allowing the heatable layer to be fed with a relatively low voltage.

It is also known to provide what are known as grid or comb electrodes on the light incidence side of photovoltaic solar cells (see for example WO 03/075 351 A1). They are often produced by screen printing and comprise a bus bar arranged at the edge of the solar cell and a plurality of very narrow prongs, which extend from the bus bar over the surface area of the solar cell. They make it possible for the photovoltaic voltage that is applied to the two sides representing the surfaces of the absorber or between the comb electrode on the front side and the metallic/full-area rear electrode to be picked up over the surface area, without greatly reducing the light that enters the absorber.

DE 197 02 448 A1 discloses a heatable mirror, on the glass body of which two conductor tracks or electrodes formed in the manner of a comb and interlocking each other are applied with a PTC coating covering them and filling the intermediate spaces between the prongs of the comb. Here, however, the problem of making the coating visually unobtrusive does not arise, because the conductor tracks and the heating layer can lie behind the mirror layer.

DE 198 32 228 A1 describes a vehicle window with an electrically conductive and optically transparent coating that is used as an antenna. High-frequency radio signals are picked up purely capacitively from the antenna layer with the aid of a coupling electrode, which comprises a number of thin interconnected wires that are arranged parallel to one another at a great distance in comparison with their diameter and extend from the edge into the viewing area of the window, where they end blind. There is no galvanic coupling between the coating and these wires, since they are in each case arranged in different planes of the laminated window.

The patent DE 10 2004 050 158 B3 describes a transparent pane with a heatable coating.

The bus bars, already mentioned several times, may be produced both by (screen) printing, before or after the layer is applied to the window, or by soldering on thin metal-band strips, preferably made of (tin-plated) copper. There are also combinations of printed and metal-band bus bars (see for example DE 198 29 151 C1). Although the bus bars are usually configured in the form of a narrow band, they are opaque. For optical reasons, they are therefore respectively arranged in the vicinity of the outer edge of the transparent windows concerned. They can usually be masked by opaque edge coatings (usually likewise produced by screen printing). The communication windows mentioned may also be masked by these edge coatings, as long as the latter are sufficiently transmissive for the radiation that is to be transmitted.

In the case of common vehicle windscreens, these opaque coatings are configured as frames which, as a further function, shield the adhesive bond between the window and the vehicle body against UV rays. These frames circumscribe the viewing area of the windows. In the case of windscreens, a distinction is made furthermore between an A viewing area, in the middle of the area of the window, in which there must not be any viewing impediments (for example colourations, wires or instances of damage), and the B viewing area, lying closer to the edge.

SUMMARY

The invention is based on the object of providing a transparent pane with a heatable coating that can be operated with relatively low operating voltages and nevertheless provides homogeneous heat distribution, with less impediment of the view through the pane.

This object is achieved according to the invention by the features of patent claim 1. The features of the subclaims provide advantageous developments of this invention.

With these features and measures, a relative shortening of the path of the current flow within the comparatively high-impedance coating itself is achieved, because part of the distance between the actual bus bars and the central main heating area is bridged by low-impedance auxiliary conductor structures. Furthermore, the transitional resistance between the bus bar and the coating is further reduced by great enlargement of the contact areas. As a consequence, the required voltage for driving the heating current over the heating area also becomes lower.

Although this configuration is used with particular preference for windscreens, for which a good view through the pane in the central viewing area is important for safe driving, heatable panes according to the invention may also be fitted elsewhere in vehicles as well as in other mobile machinery and equipment and in buildings.

While in the case of the conventional solar cells with grid or comb electrodes, the voltage is applied over the thickness of the absorber layer, in the case of the application according to the invention voltage is applied with the aim of allowing a current to flow in the surface area of the coating. The low-impedance conductive structures according to the invention consequently have the effect of bringing the bus bars that are usually arranged at the edge of the pane electrically closer together, without however significantly impeding the viewing area of the pane.

In use in vehicles, the configuration according to the invention makes it possible in particular for the windscreen heating to be fed directly with the conventional vehicle voltage of 12 to 15 V d.c., a coating that has the lowest possible impedance of course being very conducive to achieving this. The length of the auxiliary conductors is dimensioned according to the effective sheet resistance of the respective coating; the better the conductivity of the coating itself, the shorter the auxiliary conductors can be.

Nevertheless, with this configuration the full-area coating of the transparent pane—apart from any communication windows that may have to be provided—can be retained, so that neither masking nor delaminating measures are necessary. Consequently, the positive properties of the coating, that is to say in particular infrared reflection (heat insulation) and homogeneous colouring, are retained over the entire surface area.

Since the transparent pane is in almost all cases configured as a laminated pane, the coating itself being arranged on a surface area lying inside the laminated structure, the conducting structures could also be configured by printing and as fine wires or wire grids, which are for example fixed in a way known per se on a composite adhesive film and then placed with this film onto the coating, thereby coming into electrical contact with the coating. This contact is stable for a long time after the final adhesive bonding of the laminated window.

In the configuration as screen-printed structures, the low-impedance conducting structures are preferably applied to a substrate (glass or plastic sheet or plastic film) before the coating is deposited. This may take place in one operation with the application of the actual bus bars.

It is also possible with adapted low-impedance conducting structures to provide a low-impedance bridge for a communication window that has for instance been introduced into the coating at the edge of the pane, without the formation of hot spots having to be feared. The currents in the known problem zones at the lateral edges of such communication windows are reduced very greatly by corresponding structures.

Further details and advantages of the subject matter of the invention emerge from the drawing of an exemplary embodiment in the form of a vehicle windscreen and the detailed description thereof which follows.

BRIEF DESCRIPTION OF DRAWINGS

In the simplified drawing, which is not true to scale.

DETAILED DESCRIPTION

Figure 1:
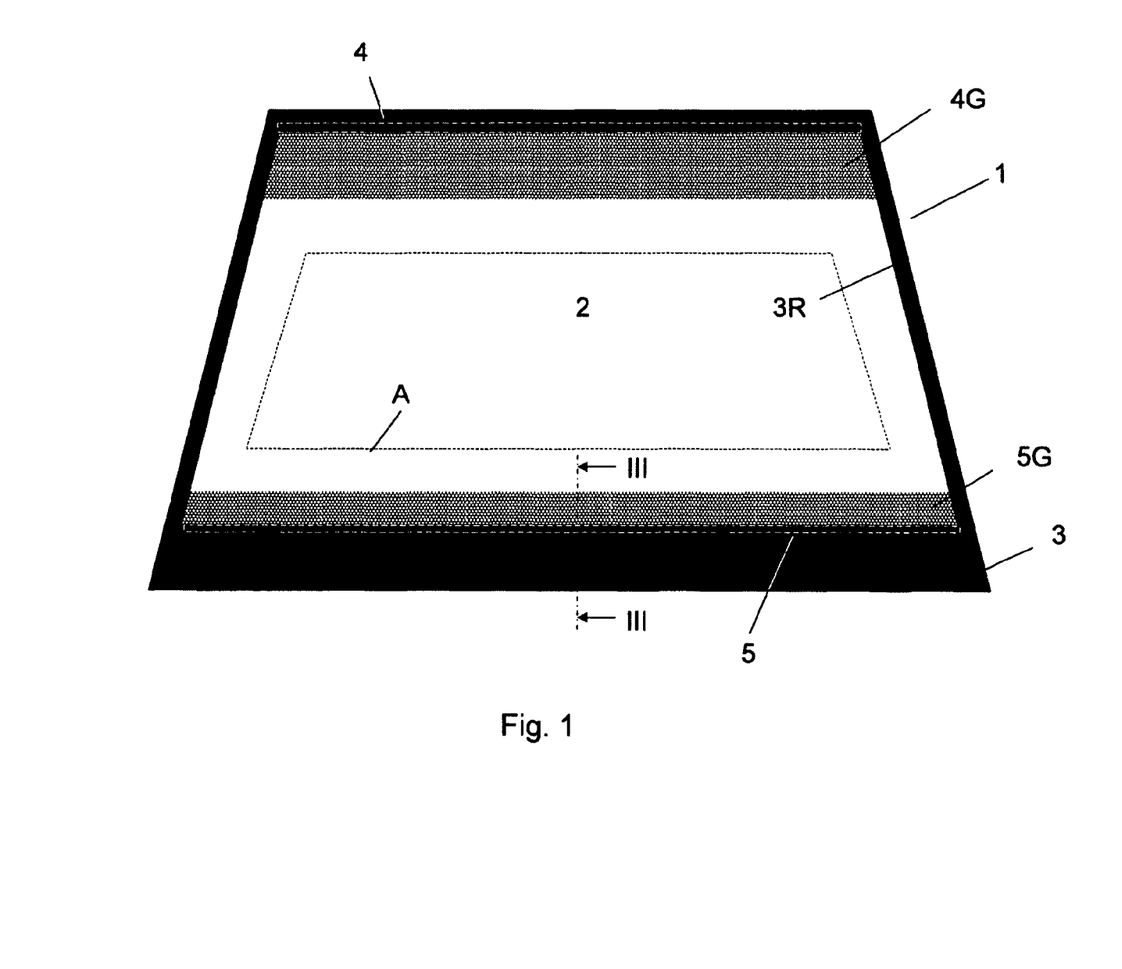
FIG. 1 shows an embodiment of a transparent pane with an electrically heatable coating, with bus bars in band form and conductor elements.

According to FIG. 1, a full-area transparent and electrically conductive coating 2 is embedded in a way known per se in a heatable laminated pane 1 of a substantially trapezoidal (curved) outline. The outer edge of the continuously coated surface area is set back inwards on all sides from the outer edge of the laminated pane 1, or an edge strip is divided off from the full-area coating. This achieves on the one hand the effect of an electrical insulation with respect to the outside, on the other hand the effect of protecting the coating against corrosion damage penetrating from the outer edge. The inset of the outer edge can be produced by removing the coating along the edge of the window, by masking the substrate before depositing the coating or else by introducing a separating line which penetrates the coating, runs around the outer edge of the pane and may serve the purposes of insulation and corrosion protection.

The coating itself consists with preference, and in a way known per se, of a system of layers that can withstand high thermal loads, with at least one metallic sublayer which can endure the temperatures required for bending glass sheets of over 600° C. undamaged, i.e. without impairment of its optical, heat-reflecting and electrical properties. Apart from metallic layers (preferably silver), the system of layers also comprises further sublayers such as antireflective layers and possibly blocking layers.

In connection with the present invention, however, other electrically conductive systems of layers with lower thermal endurance can also be used, and in particular also systems of layers that are not deposited directly on a rigid glass or plastic sheet but on a plastic film (preferably a PET film). All these systems of layers are deposited with preference by sputtering (magnetron sputtering).

The sheet resistance of common systems of layers of the aforementioned type lies between 2 and 5 Ω/square of surface area. Vehicle windscreens with such systems of layers must achieve an overall light transmission of at least 75%.

The preferred sheet resistance of the systems of layers lies in the range from 0.5 Ω/square of surface area to 1.5 Ω/square of surface area at a voltage of 12 volts to 15 volts. Vehicle windscreens with such systems of layers must have an overall light transmission of at least greater than or equal to 70%.

Applied in the form of a frame to the edge of the laminated pane 1 is an opaque colour layer 3, the inner edge 3R of which circumscribes the viewing area of the transparent pane 1. It may lie in a different plane (lying on the inside or outside of the laminated structure) of the laminated pane as a coating. It serves as a protective layer against UV radiation for an adhesive strand, with which the finished pane is adhesively bonded into a vehicle body. Furthermore, it may optically mask connection elements for additional electrical functions of the pane 1.

So, in the area region that is covered by the colour layer 3, a first bus bar 4 can be seen along the upper edge of the laminated pane 1 and a second bus bar 5 can be seen along the lower edge, indicated by a dashed line. The two bus bars 4 and 5 are directly connected in an electrically conducting manner to the coating 2 and the low-impedance conducting structure 4G and 5G.

Figure 6:
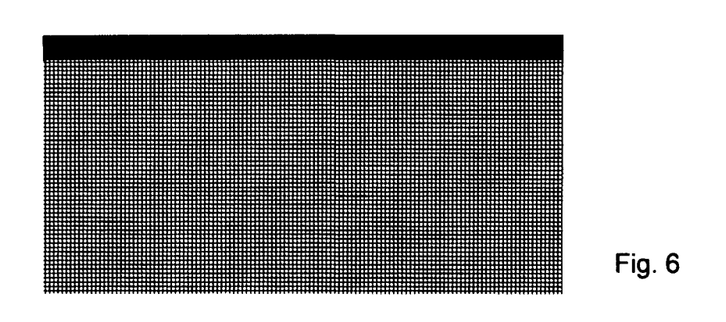

Also visible in FIG. 6 underneath the bus bar 4, in the middle of the pane, is a communication window 2C, which is likewise covered by the colour layer 3 and is consequently optically masked.

Many vehicle windscreens are provided along their upper edge with a tinted, but translucent strip ("band filter") (not represented here), which in particular reduces glare caused by sun rays. Such a strip also can contribute to optically masking the communication window. It may also be used in combination with the conducting structure G4.

The laminated pane 1 generally comprises two rigid sheets of glass and/or plastic and an adhesive layer bonding them over their surface area. The bus bars 4 and 5 are placed onto the adhesive layer (for example a thermoplastic adhesive film of polyvinyl butyral PVB, of ethylene vinyl acetate EVA or of polyurethane PU) and fixed on the surface thereof before the adhesive layer is placed together with and bonded to the rigid sheets.

The bus bars 4 and 5 may also comprise thin, narrow metal foil strips (copper, aluminium), which are usually prefixed on the adhesive film and, when the layers of the laminate are put together, are placed onto the coating with electrical contact. The electrical contact may, however, also be ensured by soldering on the bus bars 4 and 5. In the later autoclaving process, a reliable contact between the bus bars and the coating is achieved by the effect of heat and pressure.

As already mentioned, the bus bars 4 and 5 may alternatively or additionally be produced by printing on a conductive paste, which is baked before the bending and/or during the bending of the glass sheets. This is also much less laborious than placing on portions of metal band. However, at least in continuous industrial production, printed bus bars have a higher ohmic resistance than those of metal foil strips. Therefore, fixing on metal-foil or screen-printed bus bars is possible only in dependence on the individual type of pane and possibly on the overall resistance of the system of heating layers.

In comparison with the coating 2, the bus bars always have negligible ohmic resistances and do not appreciably heat up during the operation of the heating.

It is possible in a way known per se to provide two (or more) separately electrically feedable heating areas in the laminated pane 1 (with vertical division for example in the middle of the pane), which of course also have to be connected to the respective voltage source by means of separate external connections. In this case, a common conductor may be used for both heating areas, so that only the bus bar 4 or the bus bar 5 is to be subdivided into two portions, while the other one, respectively, is continuous. In the first variant, four external connections are necessary, in the second variant only three.

The external connections themselves are not discussed in any more detail here, since they are already described in many instances of the prior art.

Schematically indicated by a dash-dotted line $\underline{A}$ within the viewing area that is circumscribed by the edge 3R of the colour layer 3 is what is known as the A viewing area of the windscreen. The line $\underline{A}$ is not an actual edge or the like in the window or the coating but serves only for the visual illustration of the approximate position of the imaginary A viewing area. The latter is defined in Annex 18 of ECE R43 on the basis of specific parameters of an arbitrary vehicle environment. In this area, any kind of viewing impediment is inadmissible. Extending around the A viewing area is the B viewing area, in which slight viewing impediments due to internal fittings etc. are admissible.

From the upper bus bar 4 there extends a conducting structure 4G into the viewing area of the laminated pane 1, from the edge region that is covered by the colour layer 3. It is electrically connected to the bus bar 4 and to the coating 2 and is for its part low in impedance in comparison with the latter. Also from the lower bus bar 5 there extends a conducting structure 5G into the B viewing area of the laminated pane 1.

While in the case of conventional panes with layer heating of this type, the heating current must flow over the entire distance between the bus bars exclusively via the coating, with the conducting structures according to the present invention this distance can be shortened to values between 50 and 80%, depending on the extent of the A viewing area.

For the purposes of the present invention that have already being discussed further above, apart from their good conductivity, the conducting structures 4G and 5G must also have an electrical contact with the coating.

With preference, the grid elements are printed from a silver-containing screen printing paste of good conductivity. The conducting structures 4G/5G preferably have dark colours.

If printed bus bars 4 and 5 are used, the latter can be produced with the conducting structures 4G/5G in one operation and from the same printing paste. After that, no separate operations are required any longer for the electrical contacting of the conducting structures and the bus bars.

If, on the other hand, bus bars comprising metal foil bands are used, they must be electrically connected with low impedance to the coating and the conducting structures. The tin-plated foil bands are preferably soldered with the conducting structures in a way known per se. In principle, the printing pastes with a high proportion of metal that are used here can be soldered well with tin-plated metal bands.

The lengths and mutual distances between the conducting structures 4G and 5G, and the dimensions of the bus bars can only be schematically represented here. However, the relative dimensions are evident; while the actual bus bars 4 and 5 are configured in the conventional band form with a width of several millimetres, the conducting structures 4G and 5G are as optically visible as possible and have an attractive design.

Although the individual configuration in an actual laminated pane can be predetermined within broad limits by simulations, it remains very strongly dependent on the size or dimensions of the actual pane, on the type of bus bars and on the electrical properties of the actual coating.

For example, it may also be adequate to combine only one of the bus bars with a conducting structure. With a relatively small distance between the two bus bars 4 and 5, the conducting structures themselves may also be shortened.

Figure 2:
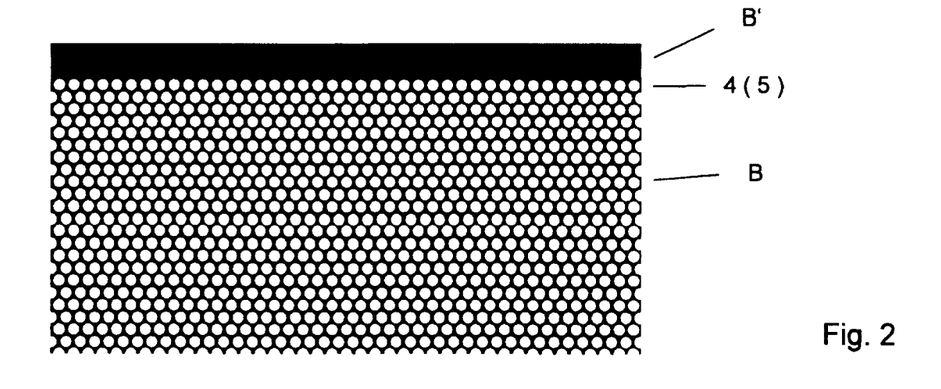
FIG. 2 shows a detail from a conducting structure with circular structures.
Figure 3:
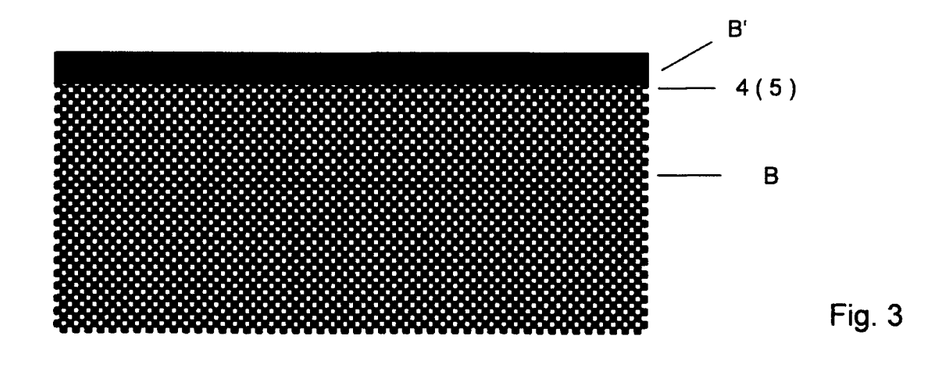
FIG. 3 shows a detail from a conducting structure with square structures.
Figure 4:
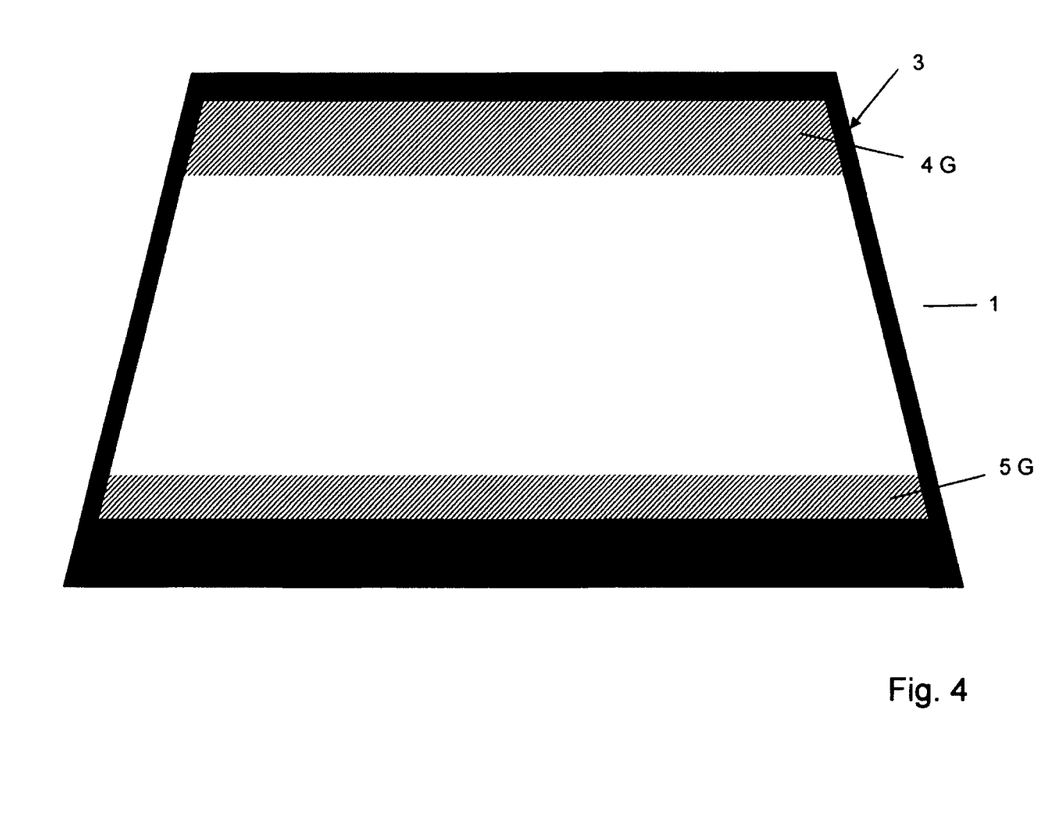
FIG. 4 shows, in a way similar to FIG. 1, a windscreen with regions allowing a high degree of visibility through free structures.
Figure 5:
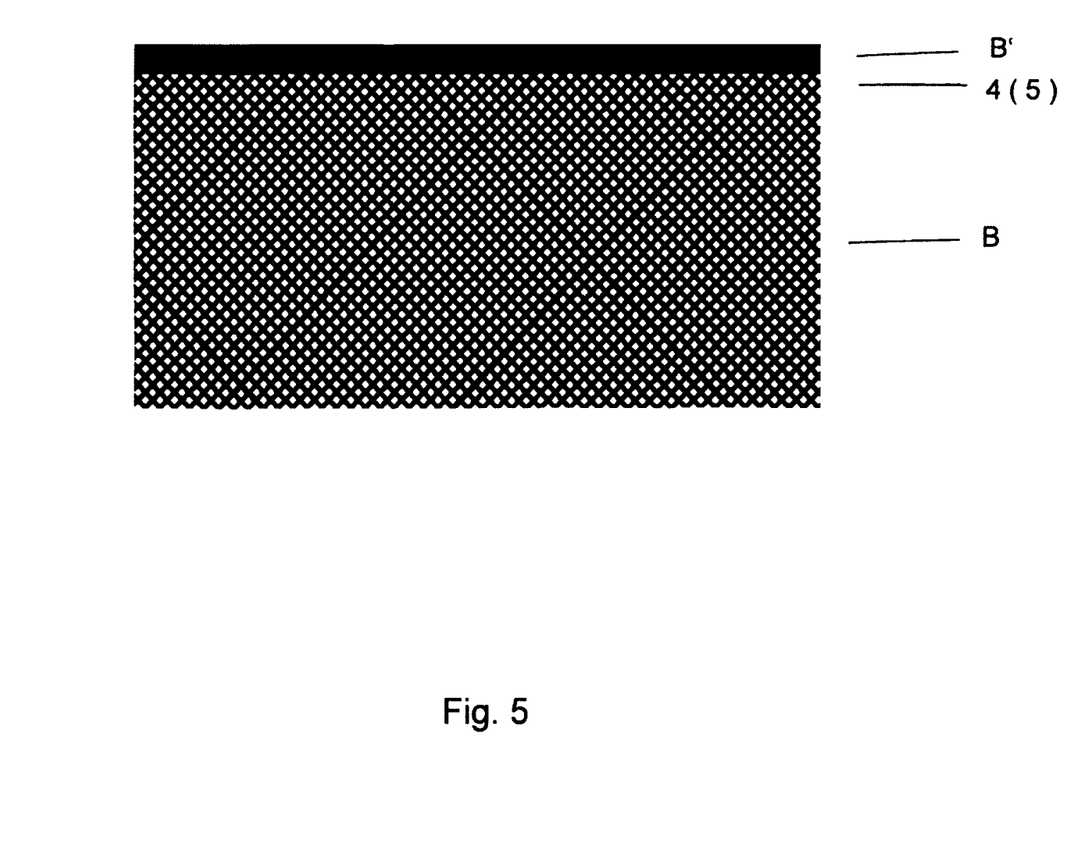
FIGS. 5, 6, 8 and 9 show a detail from a conducting structure with checked structures.

FIGS. 2 to 10 show various structures for the surface of the conducting structures (4G) and (5G), which are generally referred to as conductor elements. The structures may have circular or inversely circular patterns, as shown in FIG. 2. They may, however, also have chequerboard patterns, as represented in FIG. 3. The structures may also have printed fine, conductive structures (mesh) M with high conductivity, as represented in FIG. 4. A checked pattern for the conductor elements is represented in FIGS. 5, 6, 8 and 9. The patterns may have various sizes, for instance the circles in FIG. 2 have a diameter of 0.1-10 mm, preferably of 0.2-5 mm. The checks and squares in FIGS. 5, 6, 8, 9 and 10 have dimensions of 0.1-10 mm, preferably 0.5-5 mm.

Figure 7:
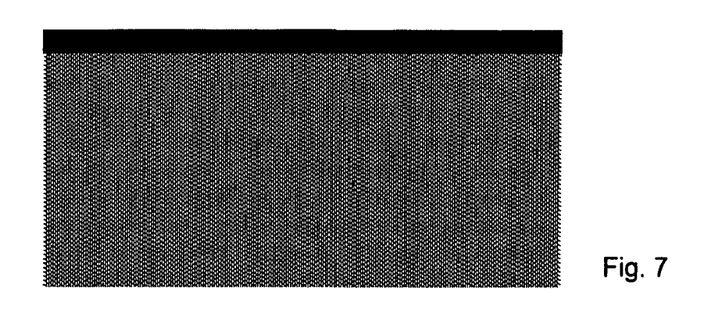
FIG. 7 shows a detail from a conducting structure with zigzag structures.
Figure 8:
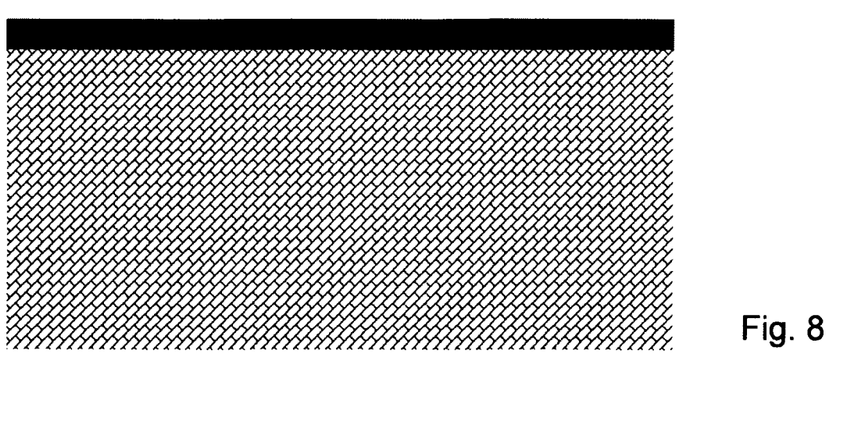
Figure 9:
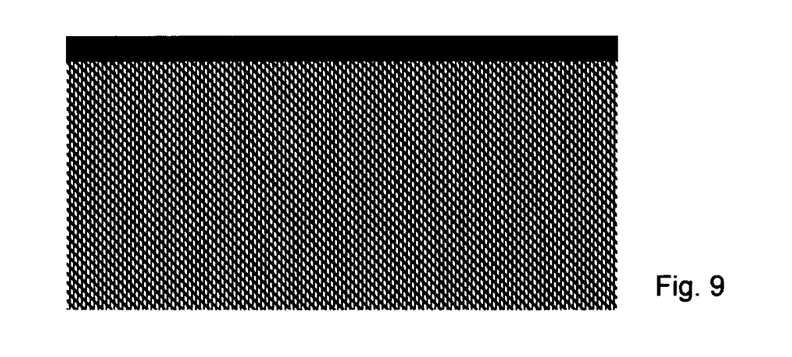
Figure 10:
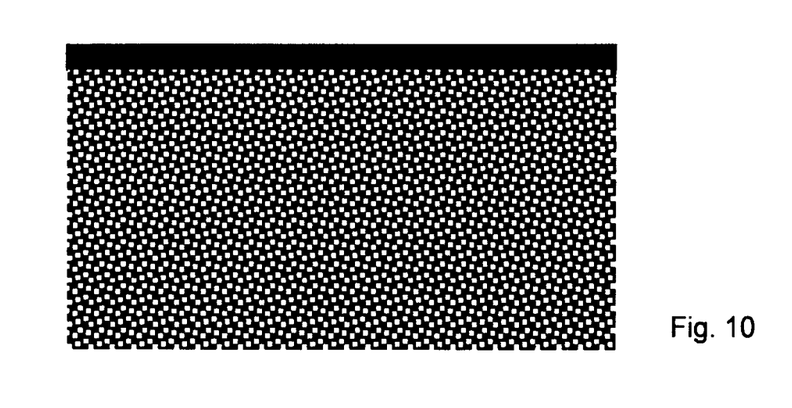
FIG. 10 shows a detail from a conducting structure with square structures.

FIG. 7 shows a zigzag pattern.

Figure 11:
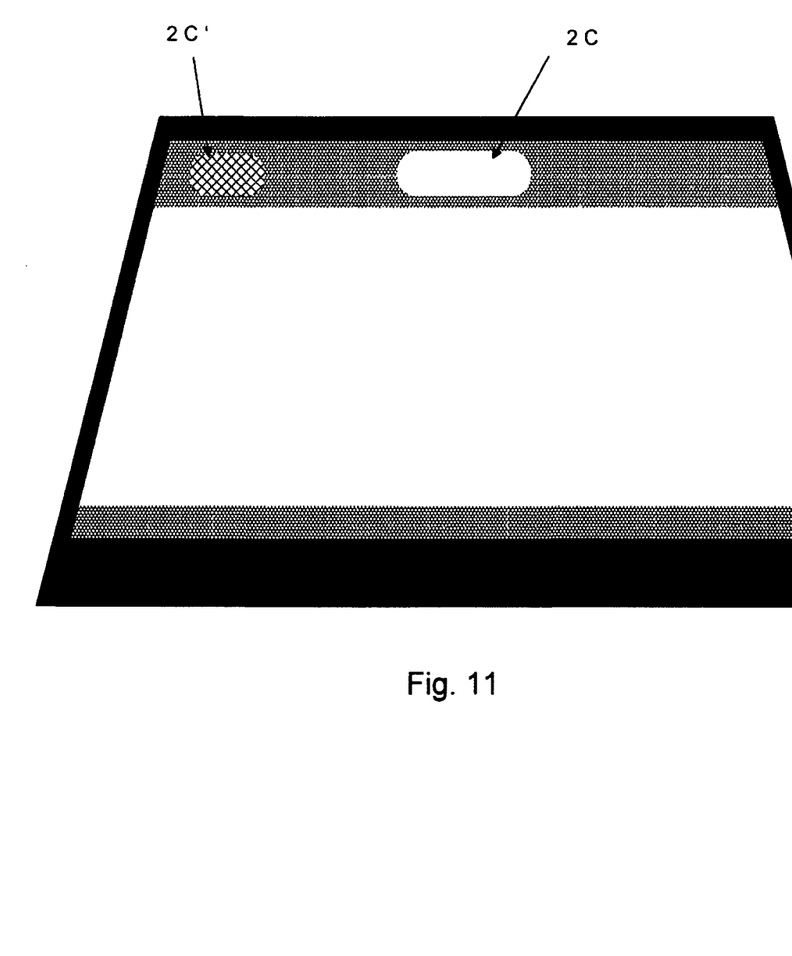
FIG. 11 shows a windscreen with communication windows.

FIG. 11 shows a front windscreen with a communication window 2C. The communication window 2C may be circular, oval, square, rectangular or triangular. The communication window 2C is preferably a region that is free of any conductive, printed structure. The conductive, electrically heatable coating may be removed in the communication window 2C. The communication window 2C' may be laminated with a nonconductive print to obtain a better appearance.

Figure 12:
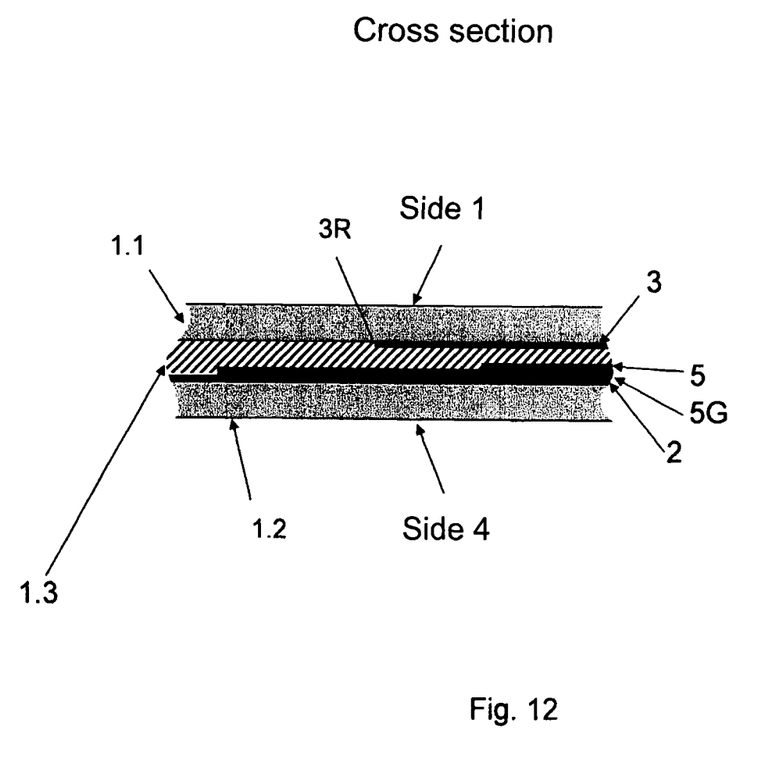
FIG. 12 shows a cross section through a laminated pane.

FIG. 12 shows a sectional view through the edge of the pane 1 along the line in FIG. 1. Two rigid individual sheets 1.1, 1.2 (of glass or plastic) can be seen, as well as an optically clearly transparent, electrically insulating adhesive layer 1.3 that adhesively bonds the sheets in the conventional way. To make it visible, the conductive glass coating is depicted here by grey shading. The adhesive layer may be formed in the conventional way by an approximately 0.76 mm thick PVB film.

It can be seen that the coating 2 lies on the sheet 1.2 above the bus bar 5 and the grid element 5G adjoining the latter, which have been applied here as screen-printed structures before the layer 2 is deposited. The opaque colour layer 3 is printed on here on the surface area of the sheet 1.1 that is lying on the inside in the laminated structure and, in vertical projection (direction of view through the pane), it covers the bus bar 5 and the portion of the conducting structure 5G directly adjoining the latter. The conducting structure 5G continues to run, however, over the edge 3R of the opaque colour layer 3 into the viewing area of the pane 1.

As a departure from this representation, the opaque colour layer 3 could also lie on the outer surface areas (not visible here) of one of the sheets 1.1 or 1.2, or else on the same surface as the coating 2 and the bus bars 4 and 5.

The invention claimed is:

1. A transparent pane comprising an adhesive layer sandwiched between a first rigid sheet and a second rigid sheet, the transparent pane comprising:
    an electrically heatable coating, the electrically heatable coating extending over a major part of a surface area of the transparent pane and being electrically connected to at least two low-impedance bus bars lying opposite one another, and
    at least one electrically conductive structure, extending over the electrically heatable coating, from an edge of one of the at least two low-impedance bus bars, toward an interior section of the transparent pane,
    the electrically heatable coating being layered on the first rigid sheet of the transparent pane,
    the at least one electrically conductive structure being layered on the electrically heatable coating,
    the at least two low-impedance bus bars being layered on the at least one electrically conductive structure,
    the adhesive layer being layered over the electrically heatable coating, the at least one electrically conductive structure, and the at least two low-impedance bus bars, and
    the second rigid sheet being layered on the adhesive layer, wherein
        during operation, current flows in a part of the heating area that is not covered by the at least one electrically conductive structure,
        the at least one electrically conductive structure is formed as a printed uniform pattern, the at least one electrically conductive structure being homogenous over a width of the transparent pane, wherein the printed uniform pattern is formed from a screen printing paste having a dark colour,
        the at least one electrically conductive structure is adapted to connect electrically to the one of the at least two low-impedance bus bars and to the electrically heatable coating,
        the at least one electrically conductive structure has lower resistance than the electrically heatable coating;
        wherein the printed uniform pattern comprises inversely circular, chequerboard, square, checked, point or zigzag pattern,
        wherein the printed uniform pattern comprises a covered area having a longitudinal and a lateral dimension, and
        wherein the at least one electrically conductive structure further comprises an uncovered area uncovered by the printed uniform pattern, wherein the covered area is equal or greater than the uncovered area.

2. The transparent pane according to claim 1, wherein lines or wires of no more than 0.5 mm, preferably no more than 0.3 mm, in width or thickness, are projected over the surface area of the transparent pane.

3. The transparent pane according to claim 1, wherein the bus bars are produced by printing and/or from metal foils.

4. The transparent pane according to claim 3, wherein the bus bars are printed onto a respective substrate before or after the electrically heatable coating is applied.

5. The transparent pane according to claim 3, wherein the bus bars are electrically connected to the electrically heatable coating and to the at least one electrically conductive structure by soldering at least at discrete contact points.

6. The transparent pane according to claim 1, wherein the at least one electrically conductive structure is a plurality of electrically conductive structures arranged at uniform or non-uniform distances from one another.

7. The transparent pane according to claim 1, wherein the at least one electrically conductive structure is a plurality of electrically conductive structures configured all with the same length or with different lengths.

8. The transparent pane according to claim 1, wherein the at least one electrically conductive structure is arranged only over part of the longitudinal extent of one or both bus bars.

9. The transparent pane according to claim 1, configured as a vehicle windscreen, wherein the at least one electrically conductive structure extends at most to the limit of a standardized viewing area of the windscreen.

10. The transparent pane according to claim 1, further comprising a tinted color strip extending at least along an upper edge of the pane, the strip covering at least partially the at least one electrically conductive structure arranged along its extension.

11. The transparent pane according to claim 1, further comprising two rigid sheets of glass and/or plastic and/or a plastic film, wherein the electrically heatable coating, the bus bars and the at least one electrically conductive structure are arranged on surface areas of the sheet that are lying inside a laminated structure defined by the transparent pane.

12. The transparent pane according to claim 1, wherein the electrically conductive structure is partially congruent with the one of the at least two low-impedance bus bars and shortens the electrical path between the at least two low-impedance bus bars.

13. The transparent pane according to claim 1, further comprising an opaque colour layer circumscribing the pane, the opaque colour layer being layered within the pane or outside of the pane.

14. The transparent pane according to claim 1, wherein the longitudinal dimension is substantially similar in value to the lateral dimension.

15. A transparent pane comprising an adhesive layer sandwiched between a first rigid sheet and a second rigid sheet, the transparent pane comprising:
- an electrically heatable coating, the electrically heatable coating extending over a major part of a surface area of the transparent pane and being electrically connected to at least two low-impedance bus bars lying opposite one another, and
- at least one electrically conductive structure, extending over the electrically heatable coating, from an edge of one of the at least two low-impedance bus bars, toward an interior section of the transparent pane,
- the electrically heatable coating being layered on the first rigid sheet of the transparent pane,
- the at least one electrically conductive structure being layered on the electrically heatable coating,
- the at least two low-impedance bus bars being layered on the at least one electrically conductive structure,
- the adhesive layer being layered over the electrically heatable coating, the at least one electrically conductive structure, and the at least two low-impedance bus bars, and
- the second rigid sheet being layered on the adhesive layer, wherein
  - during operation, current flows in a part of the heating area that is not covered by the at least one electrically conductive structure,
  - the at least one electrically conductive structure is formed as a printed uniform pattern, wherein the printed uniform pattern is formed from a screen printing paste having a dark colour,
  - the at least one electrically conductive structure is configured as a line, open or closed loop, straight line, arc and/or meander,
  - the at least one electrically conductive structure is adapted to connect electrically to the one of the at least two low-impedance bus bars and to the electrically heatable coating,
  - the at least one electrically conductive structure has lower resistance than the electrically heatable coating;
  - wherein the printed uniform pattern comprises, inversely circular, chequerboard, square, checked, point or zigzag pattern,
  - wherein the printed uniform pattern comprises a covered area having a longitudinal and a lateral dimension, and
  - wherein the at least one electrically conductive structure further comprises an uncovered area uncovered by the printed uniform pattern, wherein the covered area is equal or greater than the uncovered area.

16. The transparent pane according to claim 15, wherein the electrically conductive structure is partially congruent with the one of the at least two low-impedance bus bars and shortens the electrical path between the at least two low-impedance bus bars.

17. A transparent pane comprising an adhesive layer sandwiched between a first rigid sheet and a second rigid sheet, the transparent pane comprising:
- an electrically heatable coating, the electrically heatable coating extending over a major part of a surface area of the transparent pane and being electrically connected to at least two low-impedance bus bars lying opposite one another, and
- at least one electrically conductive structure, extending over the electrically heatable coating, from an edge of one of the at least two low-impedance bus bars, toward an interior section of the transparent pane,
- the electrically heatable coating being layered on the first rigid sheet of the transparent pane,
- the at least one electrically conductive structure being layered on the electrically heatable coating,
- the at least two low-impedance bus bars being layered on the at least one electrically conductive structure,
- the adhesive layer being layered over the electrically heatable coating, the at least one electrically conductive structure, and the at least two low-impedance bus bars, and
- the second rigid sheet being layered on the adhesive layer, wherein
  - during operation, current flows in a part of the heating area that is not covered by the at least one electrically conductive structure,
  - the at least one electrically conductive structure is formed as a printed uniform pattern, wherein the printed uniform pattern is formed from a screen printing paste having a dark colour,
  - the at least one electrically conductive structure comprises at least one non-printed region,
  - the at least one electrically conductive structure is adapted to connect electrically to the one of the at least two low-impedance bus bars and to the electrically heatable coating,
  - the at least one electrically conductive structure has lower resistance than the electrically heatable coating;
  - wherein the printed uniform pattern comprises an inversely circular, chequerboard, square, checked, point or zigzag pattern,
  - wherein the printed uniform pattern comprises a covered area having a longitudinal and a lateral dimension, and
  - wherein the at least one electrically conductive structure further comprises an uncovered area uncovered by the printed uniform pattern, wherein the covered area is equal or greater than the uncovered area.

18. The transparent pane according to claim 17, wherein the electrically conductive structure is partially congruent with the one of the at least two low-impedance bus bars and shortens the electrical path between the at least two low-impedance bus bars.

19. A transparent pane comprising an adhesive layer sandwiched between a first rigid sheet and a second rigid sheet, the transparent pane comprising:
- an electrically heatable coating, the electrically heatable coating extending over a major part of a surface area of the transparent pane and being electrically connected to at least two low-impedance bus bars lying opposite one another, and
- at least one electrically conductive structure, extending over the electrically heatable coating, from an edge of one of the at least two low-impedance bus bars, toward an interior section of the transparent pane,
- the electrically heatable coating being layered on the first rigid sheet of the transparent pane,
- the at least one electrically conductive structure being layered on the electrically heatable coating,
- the at least two low-impedance bus bars being layered on the at least one electrically conductive structure, the adhesive layer being layered over the electrically heatable coating, the at least one electrically conductive structure, and the at least two low-impedance bus bars, and the second rigid sheet being layered on the adhesive layer, wherein during operation, current flows in a part of the heating area that is not covered by the at least one electrically conductive structure, the at least one electrically conductive structure is formed as a printed uniform pattern, wherein the printed uniform pattern is formed from a screen printing paste having a dark colour, the at least one electrically conductive structure comprises a uniform pattern with a plurality of inversely circular, chequerboard, checked structures, zigzag structures, or checks and squares surfaces, the printed uniform pattern comprises a covered are having a longitudinal and a lateral dimension, the at least one electrically conductive structure is adapted to connect electrically to the one of the at least two low-impedance bus bars and to the electrically heatable coating, the at least one electrically conductive structure has lower resistance than the electrically heatable coating, and wherein the at least one electrically conductive structure further comprises an uncovered area uncovered by the printed uniform pattern, wherein the covered area is equal or greater than the uncovered area.

20. The transparent pane according to claim 19, wherein a conductive glass coating, a printed, low-impedance electrically conductive structure, a plastic film and a nonconductive black print are contained between an inner side and an outer side.

21. The transparent pane according to claim 19, wherein the electrically conductive structure is partially congruent with the one of the at least two low-impedance bus bars and shortens the electrical path between the at least two low-impedance bus bars.

* * * * *